United States Patent

Hirata et al.

[11] Patent Number: 5,912,284
[45] Date of Patent: Jun. 15, 1999

[54] CEMENT ADDITIVE, ITS PRODUCTION PROCESS AND USE

[75] Inventors: Tsuyoshi Hirata, Kobe; Tsutomu Yuasa, Osaka; Katsuhisa Shiote, Yokohama; Syogo Iwai, Kawasaki; Koichiro Nagare, Suita, all of Japan

[73] Assignee: Nippon Shokubai Co., Ltd., Japan

[21] Appl. No.: 08/992,328

[22] Filed: Dec. 17, 1997

[30] Foreign Application Priority Data

Dec. 26, 1996 [JP] Japan ................................. 8-348202
Dec. 26, 1996 [JP] Japan ................................. 8-348203

[51] Int. Cl.⁶ .................................................. C08K 3/00
[52] U.S. Cl. ........................................................ 524/5
[58] Field of Search ........................................ 524/5

[56] References Cited

U.S. PATENT DOCUMENTS

| | | | |
|---|---|---|---|
| 3,544,344 | 12/1970 | Pratt et al. | 524/5 |
| 3,563,930 | 2/1971 | Stram et al. | 524/5 |
| 4,471,100 | 9/1984 | Tsubakimoto et al. | 524/4 |
| 4,946,904 | 8/1990 | Akimoto et al. | 524/5 |
| 5,162,402 | 11/1992 | Ogawa et al. | 524/5 |
| 5,362,323 | 11/1994 | Koyata et al. | 524/5 |
| 5,432,212 | 7/1995 | Honda et al. | 524/5 |
| 5,476,885 | 12/1995 | Tahara et al. | 525/367 |
| 5,660,628 | 8/1997 | Ohta et al. | 524/5 |
| 5,661,206 | 8/1997 | Tanaka et al. | 524/5 |

FOREIGN PATENT DOCUMENTS

| | | |
|---|---|---|
| 0 056 627 | 7/1982 | European Pat. Off. . |
| 0 291 073 A2 | 11/1988 | European Pat. Off. . |
| 0 373 621 A2 | 6/1990 | European Pat. Off. . |
| 0 448 717 A1 | 10/1991 | European Pat. Off. . |
| 0 619 277 A1 | 10/1994 | European Pat. Off. . |
| 0 725 043 A2 | 8/1996 | European Pat. Off. . |
| 0 736 553 A2 | 10/1996 | European Pat. Off. . |
| 58038380 | 8/1983 | Japan . |
| 04068323 | 11/1992 | Japan . |
| 08283350 | 10/1996 | Japan . |
| 8-283350 | 10/1996 | Japan . |

*Primary Examiner*—Peter A. Szekely

[57] ABSTRACT

The present invention provides a cement additive its production process and cement composition achieving excellent slump loss prevention capability. As a cement additive, there can be a copolymer (A-1) comprising an unsaturated polyalkylene glycol ether-based monomer (I), maleic acid-based monomer (II) and other monomer (III) copolymerizable with these monomers, the monomer (I)/monomer (II)/monomer (III) weight ratio being 50-99/50-1/0-49 and the weight average molecular weight of the copolymer (A) being 10,000 to 100,000 in terms of polyethylene glycol measured by gel permeation chromatography, or a copolymer (A) with an antifoaming agent (B), wherein the copolymer (A) comprises polyalkylene glycol ether-based units and dicarboxylic acid-based units as repeating units.

12 Claims, No Drawings

CEMENT ADDITIVE, ITS PRODUCTION PROCESS AND USE

BACKGROUND OF THE INVENTION

A. Technical Field

The present invention relates to a cement additive, its production process and use. More specifically, it relates to a specific cement dispersant, its production process, a cement admixture in which an antifoaming agent is added to another cement dispersant and a cement composition, and these cement additives can give to a cement composition properties of achieving a high water reducing rate, preventing a reduction in the obtained flowability (called "slump loss") which occurs with the passage of time, and providing an appropriate stable amount of entrained air with the passage of time.

B. Background Art

The improvement of durability and strength of a concrete structure has been strongly desired in the concrete industry of nowadays and it is an important theme to reduce the amount of unit water. There are many proposals for polycarboxylic acid-based cement dispersants because they exhibit higher water reducing capability than conventional naphthalene-based cement dispersants. For instance, Japanese Patent Publication (Kokoku) No. Showa 58-38380 (JP-B-58038380) proposes a cement dispersant essentially containing a copolymer which comprises a polyethylene glycol monoallyl ether monomer, a maleic acid-based monomer and a monomer copolymerizable with these monomers in a specific ratio. However, the water reducing capability is not sufficient for cement compositions.

SUMMARY OF THE INVENTION

A. OBJECTS OF THE INVENTION

It is therefore an object of the present invention to provide a cement additive, which is superior in water reducing capability and slump loss prevention capability, production process of the additive and its use.

B. DISCLOSURE OF THE INVENTION

The inventors of the present invention have found that the below-mentioned specific copolymer (A), (A-1) or (A-2) can provide an excellent cement dispersant which exhibits high water reducing capability and prevent a slump loss and that air-entraining property is effectively reduced and a stable amount of entrained air is provided with the passage of time when the copolymer (A), (A-1) or (A-2) are combined with a antifoaming agent. The present invention is predicated upon these findings.

A cement additive of the present invention comprises as an effective component the below-mentioned copolymer (A), (A-1) or (A-2). Due to this, the cement additive of the present invention can exhibit high water reducing capability and prevent a slump loss.

In a case that the cement additive of the present invention comprises the copolymer (A), (A-1) or (A-2) and further comprises an antifoaming agent (B) as effective components, it can be effective as a cement admixture which can also reduce air-entraining property effectively.

A cement composition of the present invention comprises cement, water and the cement additive of the present invention.

The above copolymer (A) is a copolymer which has a weight average molecular weight in a. range of 10,000 to 100,000 and is obtained by polymerization of 50 to 99 wt % of an unsaturated polyalkylene glycol ether-based monomer (I) represented by the following general formula (1):

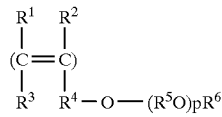

(1)

(wherein $R^1$, $R^2$ and $R^3$ each independently represent hydrogen or methyl group, $R^1$, $R^2$ and $R^3$ cannot be methyl group at the same time, $R^4$ represents —$CH_2$—, —$(CH_2)_2$— or —$C(CH_3)_2$—, a total number of carbon atom in $R^1$, $R^2$, $R^3$ and $R^4$ is 3, $R^5O$ represents one oxyalkylene group having 2 to 4 carbon atoms or a mixture of two or more of the oxyalkylene group and may be added in a block or random manner when it is a mixture, $R^6$ represents hydrogen, alkyl group having 1 to 22 carbon atoms, phenyl group or alkylphenyl group (the alkyl group in the alkylphenyl group having 1 to 22 carbon atoms), and p is an average addition number of moles of the oxyalkylene groups and represents an integer of 1 to 300), 50 to 1 wt % of maleic acid-based monomer (II) represented by the following general formula (2):

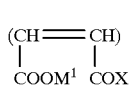

(2)

(wherein X represents —$OM^2$ or —Y—$(R^7O)qR^8$, $M^1$ and $M^2$ each independently represent hydrogen, monovalent metal, divalent metal, ammonium or organic amine, Y represents —O— or —NH—, $R^7O$ represents one oxyalkylene group having 2 to 4 carbon atoms or a mixture of two or more of the oxyalkylene group and may be added in a block or random manner when it is a mixture, $R^8$ represents hydrogen, alkyl group having 1 to 22 carbon atoms, phenyl group, alkylphenyl group, aminoalkyl group or hydroxylalkyl group (each alkyl group in the alkylphenyl, aminoalkyl and hydroxyalkyl groups having 1 to 22 carbon atoms), q is an average addition number of moles of the oxyalkylene groups and represents an integer of 0 to 300, and an acid anhydride group (—CO—O—CO—) may be formed in place of the groups —$COOM^1$ and —COX between carbon atoms to which the groups —$COOM^1$ and —COX should be bonded respectively), and 0 to 49 wt % of copolymerizable other monomer (III) (a total amount of (I), (II) and (III) being 100 wt %).

The above copolymer (A-1) comprises, as repeating units, polyalkylene glycol ether-based units (I') represented by the following general formula (3):

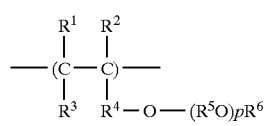

(3)

(wherein $R^1$ to $R^3$ each independently represent hydrogen or methyl group, $R^5O$ represents one oxyalkylene group having 2 to 4 carbon atoms or a mixture of two or more of the oxyalkylene group and may be added in a block or random manner when it is a mixture, $R^6$ represents hydrogen, alkyl group having 1 to 22 carbon atoms, phenyl group or alkylphenyl group (the alkyl group in the alkylphenyl-group having 1 to 22 carbon atoms), $R^4$ represents —$(CH_2)_2$— or —C(CH$_3$)$_2$—, and p is an average addition number of moles of the oxyalkylene groups and represents an integer of 1 to 300) and a dicarboxylic acid-based unit (II') represented by the following general formula (4):

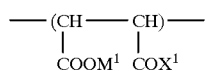
(4)

(wherein X$^1$ represents —OM$^2$ or —Y—(R$^7$O)qR$^8$, M$^1$ and M$^2$ each independently represent hydrogen, monovalent metal, divalent metal, ammonium or organic amine, Y represents —O— or —NH—, R$^7$O represents one oxyalkylene group having 2 to 4 carbon atoms or a mixture of two or more of the oxyalkylene group and may be added in a block or random manner when it is a mixture, R$^8$ represents hydrogen, alkyl group having 1 to 22 carbon atoms, phenyl group, alkylphenyl group, aminoalkyl group or hydroxylalkyl group (each alkyl group in the alkylphenyl, aminoalkyl and hydroxyalkyl groups having 1 to 22 carbon atoms), q is an average addition number of moles of the oxyalkylene groups and represents an integer of 0 to 300, and an acid anhydride group (—CO—O—CO—) may be formed in place of the groups —COOM$^1$ and —COX$^1$ between carbon atoms to which the groups —COOM$^1$ and —COX$^1$ should be bonded respectively).

The above copolymer (A-2) comprises, as repeating units, polyalkylene glycol ether-based units (I") represented by the following general formula (5):

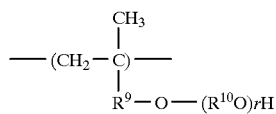
(5)

(wherein R$^{10}$O represents one oxyalkylene group having 2 to 4 carbon atoms or a mixture of two or more of the oxyalkylene group and may be added in a block or random manner when it is a mixture, R$^9$ represents —(CH$_2$)$_2$— or —C(CH$_3$)$_2$—, and r is an average addition number of moles of the oxyalkylene groups and represents an integer of 1 to 300) and dicarboxylic acid-based units (II") represented by the following general formula (6):

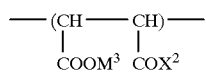
(6)

(wherein X$^2$ represents —OM$^4$ or —Z—(R$^{11}$O)sR$^{12}$, M$^3$ and M$^4$ each independently represent hydrogen, monovalent metal, divalent metal, ammonium or organic amine, Z represents —O— or —NH—, R$^{11}$O represents one oxyalkylene group having 2 to 4 carbon atoms or a mixture of two or more of the oxyalkylene group and may be added in a block or random manner when it is a mixture, R$^{12}$ represents hydrogen, alkyl group having 1 to 22 carbon atoms, phenyl group, alkylphenyl group, aminoalkyl group or hydroxylalkyl group (each alkyl group in the alkylphenyl, aminoalkyl and hydroxyalkyl groups having 1 to 22 carbon atoms), s is an average addition number of moles of the oxyalkylene groups and represents an integer of 0 to 300, and an acid anhydride group (—CO—O—CO—) may be formed in place of the groups —COOM$^3$ and —COX$^2$ between carbon atoms to which the groups —COOM$^3$ and —COX$^2$ should be bonded. respectively).

The copolymer (A), for example, may be prepared by the following production process. The process comprises carrying out aqueous solution polymerization of a monomer component at such a temperature that the half life of a radical polymerization initiator is 0.5 to 500 hours, wherein the monomer component comprises 50 to 99 wt % of an unsaturated polyalkylene glycol ether-based monomer (I) represented by the following general formula (1):

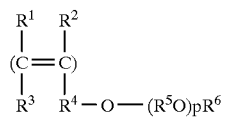
(1)

(wherein R$^1$, R$^2$ and R$^3$ each independently represent hydrogen or methyl group, R$^1$, R$^2$ and R$^3$ cannot be methyl group at the same time, R$^4$ represents —CH$_2$—, —(CH$_2$)$_2$— or —C(CH$_3$)$_2$—, a total number of carbon atom in R$^1$, R$^2$, R$^3$ and R$^4$ is 3, R$^5$O represents one oxyalkylene group having 2 to 4 carbon atoms or a mixture of two or more of the oxyalkylene group and may be added in a block or random manner when it is a mixture, R$^6$ represents hydrogen, alkyl group having 1 to 22 carbon atoms, phenyl group or alkylphenyl group (the alkyl group in the alkylphenyl group having 1 to 22 carbon atoms), and p is an average addition number of moles of the oxyalkylene groups and represents an integer of 1 to 300), 50 to 1 wt % of maleic acid-based monomer (II) represented by the following general formula (2):

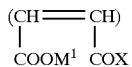
(2)

(wherein X represents —OM$^2$ or —Y— (R$^7$O)qR$^8$, M$^1$ and M$^2$ each independently represent hydrogen, monovalent metal, divalent metal, ammonium or organic amine, Y represents —O— or —NH—, R$^7$O represents one oxyalkylene group having 2 to 4 carbon atoms or a mixture of two or more of the oxyalkylene group and may be added in a block or random manner when it is a mixture, R$^8$ represents hydrogen, alkyl group having 1 to 22 carbon atoms, phenyl group, alkylphenyl group, aminoalkyl group or hydroxylalkyl group (each alkyl group in the alkylphenyl, aminoalkyl and hydroxyalkyl groups having 1 to 22 carbon atoms), q is an average addition number of moles of the oxyalkylene groups and represents an integer of 0 to 300, and an acid anhydride group (—CO—O—CO—) may be formed in place of the groups —COOM$^1$ and —COX between carbon atoms to which the groups —COOM$^1$ and —COX should be bonded respectively), and 0 to 49 wt % of copolymerizable other monomer (III) (a. total amount of (I), (II) and (III) being 100 wt %).

In the process for producing a copolymer (A), the total amount of monomers used can be, for example, in the range of 30 to 95 wt % of the total amount of raw materials used at the time of polymerization.

In the process for producing a copolymer (A), it is preferable that a persulfate is used as the radical polymerization initiator and the polymerization temperature can be, for example, in the range of 40 to 90° C. whether the total amount of monomers is in the above-mentioned range or not.

As the antifoaming agent (B), for example, there can be used an oxyalkylene-based antifoaming agent (B-1) represented by the following general formula (7):

$$R^{13}(-T-(R^{14}O)t-R^{15})n \qquad (7)$$

(wherein $R^{13}$ and $R^{15}$ each independently represent hydrogen, alkyl group having 1 to 22 carbon atoms, alkenyl group having 1 to 22 carbon atoms, alkynyl group having 1 to 22 carbon atoms, phenyl group or alkylphenyl group (the alkyl group in the alkylphenyl group having 1 to 22 carbon atoms), $R^{14}O$ represents one oxyalkylene group having 2 to 4 carbon atoms or a mixture of two or more of the oxyalkylene group and may be added in a block or random manner when it is a mixture, t is an average addition number of moles of the oxyalkylene groups and represents an integer of 0 to 300, $R^{13}$ and $R^{15}$ cannot be hydrogen at the same time when t is 0, T represents —O—, —$CO_2$—, —$SO_4$—, —$PO_4$— or —NH—, n presents an integer of 1 or 2, and n is 1 when $R^{13}$ is hydrogen).

DETAILED DESCRIPTION OF THE INVENTION

The repeating unit (I') is represented by the above general formula (1). As a monomer providing such a repeating unit, for example, there can be used the unsaturated polyalkylene glycol ether-based monomer (I) represented by the above-mentioned general formula (1). Examples of the monomer (I) are, for example, compounds obtained by adding 1 to 300 moles of alkylene oxide to an unsaturated alcohol such as 3-methyl-3-butene-1-ol, 3-methyl-2-butene-1-ol or 2-methyl-3-butene-2-ol. These compounds may be used alone or in combination of two or more.

To obtain high water reducing capability, it is important to disperse cement particles with steric repulsion and hydrophilicity due to a polyalkylene glycol chain having an average addition number of moles of oxyalkylene groups contained in the repeating unit (I') of 1 to 300. Therefore, it is preferred that a large number of oxyethylene groups be introduced into the polyalkylene glycol chain and a polyethylene glycol chain is the most preferred. From view points of polymerizability and hydrophilicity, a polyalkylene glycol chain has an average addition number of moles 1 to 100 or 5 to 100 oxyalkylene groups is suitable.

The repeating unit (II') is represented by the above general formula (2). As a monomer providing this repeating unit, for example, there can be used maleic acid-based monomer (II) represented by the above-mentioned general formula (2). Examples of the monomer (II) are, for example, maleic acid, maleic anhydride, half esters of maleic acid and alcohols having 1 to 22 carbon atoms, half amides of maleic acid and amines having 1 to 22 carbon atoms, half amides and half esters of maleic acid and amino alcohols having 1 to 22 carbon atoms, half esters of maleic acid and compounds (C) prepared by adding 1 to 300 moles of oxyalkylene having 2 to 4 carbon atoms to the alcohols, half amides of maleic acid and compounds prepared by converting a hydroxyl group at one terminal of the compounds (C) into amino group, half esters of maleic acid and glycols having 2 to 4 carbon atoms or polyalkylene glycols prepared by adding 2 to 100 moles of the glycols, half amides of maleamic acid and glycols having 2 to 4 carbon atoms or polyalkylene glycols prepared by adding 2 to 100 moles of the glycols, monovalent metal salts, divalent metal salts, ammonium salts and organic amine salts thereof, and the like. They may be used alone or in combination of two or more.

The repeating unit (I") is represented by the above general formula (5). Examples of a monomer providing the repeating unit (I") include, for example, compounds prepared by adding 1 to 300 moles of alkylene oxide to unsaturated alcohols such as 3-methyl-3-butene-1-ol and 2-methyl-2-propene-1-ol, among the monomer (I). They may be used alone or in combination of two or more.

The repeating unit (II") is represented by the above general formula (6). Examples of a monomer providing this repeating unit (II") include, for example, maleic acid, and its monovalent metal salts, divalent metal salts, ammonium salts and organic amine salts, and maleic anhydride, among the monomer (II). They may be used alone or in combination of two or more.

A repeating unit (III') other than the repeating units (I), (II), (I') and (II') can be introduced as required. As a monomer providing the repeating unit (III'), for example, there can be used a monomer (III) copolymerizable with both or either of the monomers (I) and (II). Examples of the monomer (III) include, for example, unsaturated dicarboxylic acids such as fumaric acid, itaconic acid and citraconic acid, and their monovalent metal salts, divalent metal salts, ammonium salts and organic amine salts, monoesters and diesters of those acids and alkyl alcohols having 1 to 20 carbon atoms, glycols having 2 to 4 carbon atoms or polyalkylene glycols prepared by adding 2 to 100 moles of those glycols, monoamides and diamides of those acids and alkylamines having 1 to 20 carbon atoms, one-terminal aminated products of glycols having 2 to 4 carbon atoms or one-terminal aminated products of polyalkylene glycol prepared by adding 2 to 100 moles of those glycols; diesters of maleic acid and alkyl alcohols having 1 to 20 carbon atoms, glycols having 2 to 4 carbon atoms or alkylene glycols prepared by adding 2 to 100 moles of those glycols, and diamides of those acid and alkylamines having 1 to 20 carbon atoms, one-terminal aminated products of glycols having 2 to 4 carbon atoms or one-terminal aminated products of polyalkylene glycols prepared by adding 2 to 100 moles of those glycols; unsaturated carboxylic acids such as (meth)acrylic acid, monovalent metal salts, divalent metal salts, ammonium salts and organic amine salts thereof, esters of these acids and alkyl alcohols having 1 to 20 carbon atoms, glycols having 2 to 4 carbon atoms or polyalkylene glycols prepared by adding 2 to 100 moles of these glycols, and amides of those acids and one-terminal aminated products of glycols having 2 to 4 carbon atoms or one-terminal aminated products of polyalkylene glycols prepared by adding 2 to 100 moles of these glycols; unsaturated sulfonic acids such as sulfoethyl (meth)acrylate, 2-methylpropane (meth)acrylamide sulfonate and styrenesulfonic acid, and their monovalent metal salts, divalent metal salts, ammonium salts and organic amine salts; unsaturated amides such as (meth)acrylamide and (meth)acrylalkylamide; unsaturated amino compounds such as dimethylaminoethyl (meth)acrylate; vinyl esters such as vinyl acetate and vinyl propionate; aromatic vinyls such as styrene; and the like. They may be used alone or in combination of two or more.

To obtain the copolymer (A), (A-1) or (A-2) of the present invention, a polymerization initiator is used to copolymerize the above monomer components. Copolymerization can be carried out by a known method such as solution polymerization or bulk polymerization.

Solution polymerization may be carried out in a batch or continuous manner. As a solvent used in the solution polymerization there can be exemplified water; alcohols such as methyl alcohol, ethyl alcohol and isopropyl alcohol; aromatic and aliphatic hydrocarbons such as benzene, toluene, xylene, cyclohexane and n-hexane; ester compounds such as ethyl acetate; ketone compounds such as acetone and methyl ethyl ketone; and the like. From the view point of the solubility of the raw material monomers and obtained copolymer, at least one member selected from the group consisting of water and lower alcohols having 1 to 4 carbon atoms is preferably used. Out of these, water is more preferably used as a solvent because a solvent removing step can be omitted. In a case that maleic anhydride is used for copolymerization, polymerization using an organic solvent is preferable.

When aqueous solution polymerization is carried out, for example, a water-soluble polymerization initiator such as a persulfate of ammonia or alkali metal; hydrogen peroxide; or azoamidine compound such as azobis-2-methylpropionamidine hydrochloride is used as the polymerization initiator. In this case, a promoting agent such as sodium hydrogen sulfite or Mohr's salt may be used.

In a case of carrying out aqueous solution polymerization using a radical polymerization initiator, a water-soluble polymerization initiator is used as a radical polymerization initiator, wherein the water-soluble polymerization initiator is exemplified by a persulfate such as ammonium persulfate, sodium persulfate and potassium persulfate; hydrogen peroxide; or azoamidine compound such as azobis-2-methylpropionamidine hydrochloride. In this case, a promoting agent may be used in combination of the above radical polymerization initiator, wherein the promoting agent is, for example, an alkali metal sulfite such as sodium hydrogen sulfite; meta-disulfite; sodium hypophosphite; Fe (II) salt such as Mohr's salt; sodium hydroxymethane sulfinate dihydrate; hydroxylamine hydrochloride or thiourea.

A peroxide such as benzoyl peroxide, lauroyl peroxide or sodium peroxide; hydroperoxide such as t-butyl hydroperoxide cumene hydroperoxide; azo compound such as azobisisobutyronitrile; or the like is used as a polymerization initiator (or a radical polymerization initiator) in solution polymerization which employs a lower alcohol, aromatic or aliphatic hydrocarbon, ester compound or ketone compound as a solvent. In this case, a promoting agent such as an amine compound may be used. Further, when a mixture solvent of water and a lower alcohol is used, a polymerization initiator (or a radical polymerization initiator) or a combination of a polymerization initiator (or a radical polymerization initiator) and a promoting agent can be used suitably selecting from the above polymerization initiators and combinations of polymerization initiators and promoting agents.

Bulk polymerization is carried out at a temperature of 50 to 200° C. using as a polymerization initiator (or a radical polymerization initiator) a peroxide such as benzoyl peroxide, lauroyl peroxide or sodium peroxide; hydroperoxide such as t-butyl hydroperoxide orcumene hydroperoxide; azo compound such as azobisisobutyronitrile; or the like.

The thus obtained copolymer (A), (A-1) or (A-2) may be directly used as a main ingredient of a cement dispersant or may be neutralized with an alkaline substance as required. Preferred examples of the alkaline substance include inorganic salts such as hydroxides, chlorides and carbonates of monovalent metals and divalent metals; ammonia; organic amines; and the like. In a case that maleic anhydride is used for copolymerization, the thus obtained copolymer (A), (A-1) or (A-2) may be directly used as a cement dispersant or may be hydrolized and then used.

The ((I')/(II')/(III')) weight ratio of the repeating units of the copolymer (A-1) is 1-99/99-1/0-50, preferably ((I')/(II')/(III'))=50-99/50-1/0-49, more preferably 60-95/40-5/0-30, the most preferably 70-95/30-5/0-10. The ((I")/(II")/(III")) weight ratio of the repeating units of the copolymer (A-2) is 1-99/99-1/0-50, preferably (I")/(II")/(III")=50-99/50-1/0-49, more preferably 60-95/40-5/0-30, the most preferably 70-95/30-5/0-10. The weight average molecular weights of the copolymers (A-1) and (A-2) are 5,000 to 200,000, preferably 10,000 to 100,000. If the weight ratio and weight average molecular weight are outside the above ranges, a cement dispersant which has high water reducing capability and slump loss prevention capability cannot be obtained.

Preferred processes for producing the cement additive of the present invention, especially the copolymer (A), are as follows.

(1) A method in which aqueous solution polymerization is carried out at such a temperature that the half life of the radial polymerization initiator is 0.5 to 500 hours.

(2) A method in which aqueous solution polymerization is carried out at such a temperature that the half life of the radical polymerization initiator is 0.5 to 500 hours and the total amount of monomers is 30 to 95 wt % of the total amount of raw materials used.

(3) A method in which aqueous solution polymerization is carried out at a polymerization temperature of 40 to 90° C. using a persulfate as a radical polymerization initiator.

(4) A method in which aqueous solution polymerization is carried out at a polymerization temperature of 40 to 90° C., using a persulfate as a radical polymerization initiator and the total amount of monomers is 30 to 95 wt % of the total amount of raw materials used.

In the above methods (1) to (4), to obtain a specific average molecular weight and high reactivity of monomers according to the present invention, a polymerization reaction must be carried out at such a temperature that the half life of the radical polymerization initiator is 0.5 to 500 hours, preferably 1 to 300 hours, more preferably 3 to 150 hours. For example, when a persulfate is used as an initiator, a polymerization reaction must be carried out at a temperature of 40 to 90° C., preferably 42 to 85° C., more preferably 45 to 80° C. The radical polymerization initiator may be charged into the reactor at the beginning or added dropwise to the reactor. Alternatively, these methods may be combined according to purpose. The polymerization time is preferably 2 to 6 hours, more preferably 3 to 5 hours. Outside the above range, the polymerization degree or productivity lowers disadvantageously. The total amount of monomers based on the total amount of raw materials is 30 to 95 wt %, preferably 40 to 93 wt %, more preferably 50 to 90 wt %. Outside the above range, the polymerization degree or productivity lowers disadvantageously. The monomer (I) is preferably charged into the reactor at the beginning and the monomers (II) and (III) may be charged into the reactor at the beginning or added dropwise to the reactor. Alternatively, these methods may be combined according to purpose. Further, the neutralization rate of the monomers (II) and (III) is 0 to 75%. Above 75%, water reducing capability degrades disadvantageously. Under such conditions, a polymerization reaction is carried out and neutralization and conceritration control are carried out as required after the completion of the reaction.

In the above various polymerizations, one or more chain transfer agents such as mercaptoethanol, thioglycerol, thioglycolic acid, 2-mercaptopropionic acid, 3-mercaptopropi onic acid, thiomalic acid, octyl thioglycolate, octyl 3-mercaptopropionate and 2-mercaptoethanesulfonic acid may be used as required.

The thus obtained copolymer (A) may be directly used as a main ingredient of a cement dispersant, or it may be neutralized with an alkaline substance as required. Preferred examples of the alkaline substance include inorganic salts such as hydroxides, chlorides and carbonates of monovalent metals and divalent metals; ammonia; and organic amines.

In the above methods (1) to (4), the (I)/(II)/(III) weight ratio of the monomers contained in the copolymer (A) is 50-99/50-1/0-49, preferably 60-95/40-5/0-30, more preferably 70-95/30-5/0-10. The weight average molecular weight of the copolymer (A) is 10,000 to 100,000, preferably 10,000 to 80,000, more preferably 10,000 to 70,000 in terms of polyethylene glycollmeasured by gel permeation chromatography (to be abbreviated as 'GPC' hereinafter). When the weight ratio and the weight average molecular weight are outside the above ranges, a cement dispersant having high water reducing capability and slump loss prevention capability cannot be obtained.

The antifoaming agent (B) is not limited to a particular kind if it is a known antifoaming agent. Illustrative examples of the antifoaming agent include the following.

mineral oil-based: kerosene, liquid paraffin, and the like fat and oil-based: animal oil, vegetable oil, sesame oil, castor oil, alkylene oxide adducts thereof, and the like fatty acid-based: oleic acid, stearic acid and alkylene oxide adducts thereof, and the like fatty acid ester-based: diethylene glycol laurate, glycerin monorecinolate, alkenyl succinic acid derivatives, sorbitol monolaurate, sorbitol trioleate, polyoxyethylene monolaurate, polyoxyethyiene sorbitol monolaurate, natural wax, and the lile alcohol-based: octyl alcohol, hexadecyl alcohol, acetylene alcohol, glycols, polyoxyalkylene glycol and the like amide-based: polyoxyalkyleneamide, acrylate polyamine, and the like phosphoric ester-based: tributyl phosphate, sodium octyl phosphate, and the like metal soap-based: aluminum stearate, calcium oleate, and the like silicone-based: silicone oil, silicone paste, silicone emulsion, organic modified polysiloxane, fluorosilicone oil, and the like oxyalkylene-based: polyoxyethylene polyoxypropylene adducts Among these antifoaming agents, oxyalkylene-based antifoaming agents are preferred from the view point of the combination with the cement admixture (copolymers (A-1) and (A-2)) used in the present invention. When the cement admixture of the present invention is used in combination with the oxyalkylene-based antifoaming agents, there can be obtained advantages that an amount of the antifoaming agents used is reduced and the antifoaming agents does not separate from the cement admixture in long time storage since compatibility of the antifoaming agents and the admixture is superior. The oxyalkylene-based antifoaming agents are not limited if they are a compound having an oxyalkylene group in the molecule and the function to reduce air bubbles in an aqueous solution. Among these, the specific oxyalkylene-based antifoaming agents (B-1) represented by the above general formula (7) are preferred. Examples of such an antifoaming agent (B-1) include polyoxyalkylenes such as (poly)oxyethylene (poly)oxypropylene adducts; (poly)oxyalkylene alkyl ethers such as diethylene glycol heptyl ether, polyoxyethylene oleyl ether, polyoxypropylene butyl ether, polyoxyethylene polyoxypropylene-2-ethylhexyl ether and adducts of higher alcohols having 12 to 14 carbon atoms with oxyethylene oxypropylene; (poly) oxyalkylene (alkyl)aryl ethers such as polyoxypropylene phenyl ether and polyoxyethylene nonylphenyl ether; acetylene ethers prepared by addition polymerizing an acetylene alcohol such as 2,4,7,9-tetramethyl-5-decyne-4,7-diol, 2,5-dimethyl-3-hexyne-2,5-diol or 3-methyl-1-butyne-3-ol with alkylene oxide; (poly)oxyalkylene fatty acid esters such as diethylene glycol oleic acid ester and ethylene glycol distearic acid ester; (poly)oxyalkylene sorbitan fatty acid esters such as polyoxyethylene sorbitan monolauric acid ester and polyoxyethylene sorbitan trioleic acid ester; (poly) oxyalkylene alkyl(aryl) ether sulfuric acid esters such as polyoxypropylene methyl ether sodium sulfate and polyoxyethylene dodecylphenol ether sodium sulfate; (poly) oxyalkylene alkyl phosphoric acid esters such as (poly) oxyethylene stearyl phosphoric acid ester; (poly) oxyalkylene alkyl amines such as polyoxyethylene lauryl amine; and the like. They may be used alone or in combination of two or more.

The cement composition of the present invention comprises at least cement, water and the cement admixture of the present invention. As cement which is a component of the cement composition of the present invention, there can be exemplified various well-known cement such as ordinary portland cement, alumina cement or various blended cement for cement paste, mortar or concrete, or a hydraulic composition such as blast furnace slag, fly ash or silica fume. The cement paste contains cement, water and a cement admixture as essential components. The mortar contains the same components as the cement paste and further contains as an essential component a fine aggregate such as sand. The concrete contains the same components as the mortar and further contains as an essential component coarse aggregate such as cobble or crushed stone. The unit amount of cement or water per 1 $m^3$ of a concrete are not particularly limited. The cement composition of the present invention is suitable for use in the production of a concrete having high durability and high strength. For this purpose, the unit amount of water is 120 to 200 kg/$m^3$ and water-cement raio is 15 to 70%, preferably the unit amount of water is 120 to 185 kg/$m^3$ and water-cement raio 20 to 60%.

The copolymer (A), (A-1) or (A-2) may be blended into cement in a powder form or dissolved in water to prepare an aqueous solution. The antifoaming agent may also be blended into cement in a powder form or dissolved in water. From viewpoints of the troublesome operation of weighing the copolymer (A), (A-1) or (A-2) and the antifoaming agent separately and costs for the installation of a plurality of weighing tanks, it is preferred that an aqueous solution of the copolymer (A), (A-1) or (A-2) and the antifoaming agent should be mixed together to achieve a predetermined amount of entrained air.

An aqueous solution of the copolymer (A), (A-1) or (A-2) or a mixture thereof can be directly used as a main ingredient of a cement additive and may be used in combination with another known cement admixture. Illustrative examples of the known cement admixture include conventional cement dispersants, air entraining agents, cement wetting agents, inflating materials, water-resisting agents, retarders, set accelerating agents, water-soluble polymer materials, thickeners, coagulants, dry shrinkage reducing agents, strength enhancing agents, accelerators, antifoaming agent (B) and the like.

The copolymer (A), (A-1) or (A-2) may be added in an amount of 0.01 to 1.0%, preferably 0.02 to 0.5% of the weight of cement. This addition provides such favorable effects as a reduction in the unit amount of water, an increase in strength, improvement of durability and the like. Below 0.01%, the resulting cement admixture is unsatisfactory in terms of performance and above 1.0%, further improvement cannot be obtained, which is economically disadvantageous.

The amount of the antifoaming agent (B) is 0.01 to 10 wt %, preferably 0.05 to 5 wt % of the copolymer (A), (A-1) or (A-2) in a case where the agent (B) is used. Below 0.01 wt %, it is difficult to adjust the amount of entrained air, thereby making it impossible to obtain a cement composition having stable strength. Above 10 wt %, a cement composition having excellent flowability cannot be obtained.

Methods for producing the cement composition of the present invention are not especially limited and there can be exemplified the same manners as those for producing the conventional cement compositions, such as a method that, when cement and water and other materials if necessary are mixed, the cement additive, its aqueous dispersion or aqueous solution is added to and mixed with them; a method that cement and water and other materials if necessary are mixed, and then the cement additive, its aqueous dispersion or aqueous solution is added to and mixed with the thus obtained mixture; a method that cement other materials if necessary are mixed, and then the cement additive, its aqueous dispersion or aqueous solution and water are added to and mixed with the thus obtained mixture; a method that cement and the cement additive, its aqueous dispersion or aqueous solution and other materials if necessary are mixed, and then water is added to and mixed with the thus obtained mixture.

In a case that the cement additive contains not only copolymer (A), (A-1) or (A-2) but also a component other than the copolymer, the copolymer and the other component may be seperately added.

The cement additive of the present invention is not limited by the above idea.

(Effect and Advantages of the Invention)

According to the cement additive of the present invention, high water reducing capability and slump loss prevention capability is obtained, thereby overcoming working troubles since the copolymer (A), which is contained in the cement additive as an effective component, is a polycarboxylic acid-based polymer and its monomer ratio and weight average molecular weight are specified.

The cement additive and cement composition of the present invention can achieve a high water reducing rate, prevent a reduction in its obtained flowability with the passage of time and provide an appropriate amount of entrained air which is stable with the passage of time since the cement admixture and cement composition comprises, as effective components, both the copolymer (A-1) or (A-2) and the antifoaming agent. Therefore, when the cement additive is used, a cement-composition giving a reduced slump loss and a stable amount of entrained air with the passage of time can be prepared and working troubles can be overcome.

DETAILED DESCRIPTION OF THE PREFERRED EMBODIMENTS

The following examples are given to further illustrate the present invention. However, it is to be understood that the present invention is not limited thereto. In the following examples, "%" means % by weight and "parts" means parts by weight unless otherwise stated.

<Example A1 for the production of cement dispersant (I-1)>

A glass reactor equipped with a thermometer, stirrer, dropping funnel and reflux condenser was charged with 24.2 g of ion exchange water, 50 g of an unsaturated alcohol prepared by adding 35 moles of ethylene oxide to 3-methyl-3-butene-1-ol (to be abbreviated as 'IPN-35' hereinafter), and 6.4 g of maleic acid, and the temperature inside the reactor was elevated to 60° C. An aqueous solution of 0.86 g of sodium persulfate dissolved in 13.4 g of ion exchange water was added dropwise to the reactor in 180 minutes. The temperature of the reactor was maintained at 60° C. for 60 minutes and then a polymerization reaction was completed to obtain a cement dispersant (I-1) comprising an aqueous solution of a polymer having a weight average molecular weight of 34,000.

<Example A2 for the production of cement dispersant (I-2)>

A glass reactor.equipped with a thermometer, stirrer, dropping funnel and reflux condenser was charged with 131.6 g of ion exchange water, 50 g of IPN-35 and 6.4 g of maleic. acid, and the temperature inside the reactor was elevated to 60° C. An aqueous solution of 0.86 g of sodium persulfate dissolved in 94 g of ion exchange water was added dropwise to the reactor in 180 minutes. The temperature of the reactor was maintained at 60° C. for 60 minutes and then a polymerization reaction was completed to obtain a cement dispersant (I-2) comprising an aqueous solution of a polymer having a weight average molecular weight of 17,600.

<Example A3 for the production of cement dispersant (I-3)>

A glass reactor equipped with a thermometer, stirrer, dropping funnel and reflux condenser was charged with 161 g of ion exchange water, 50 g of IPN-35 and 6.4 g of maleic acid, and the temperature inside the reactor was elevated to 60° C. An aqueous solution of 0.86 g of sodium persulfate dissolved in 94 g of ion exchange water was added dropwise to the reactor in 180 minutes. The temperature of the reactor was maintained at 60° C. for 60 minutes and then a polymerization reaction was completed to obtain a cement dispersant (I-3) comprising an aqueous solution of a polymer having a weight average molecular weight of 25,400.

<Comparative Example A1 for producing comparative cement dispersant (I-1)>

A comparative cement dispersant (I-1) was synthesized in accordance with examples of Japanese Patent Publication (Kokoku) No. Heisei 4-68323 (JP-B-04068323). That is, a glass reactor equipped with a thermometer, stirrer, dropping funnel, nitrogen feed-pipe and reflux condenser was charged with 16.7 g of ion exchange water and 50 g of an unsaturated alcohol prepared by adding 35 moles of ethylene oxide to 3-methyl-3-butene-1-ol (to be abbreviated as 'IPN-35' hereinafter). The temperature of the reactor was elevated to 95° C. and an aqueous solution of 6.4 g of maleic acid and 0.57 g of ammonium persulfate dissolved in 9.9 g of ion exchange water was added dropwise to the reactor in 120 minutes. Thereafter, an aqueous solution of 0.29 g of ammonium persulfate dissolved in 3.8 g of ion exchange water was added dropwise to the reactor in 60 minutes while the temperature was maintained at 95° C. to complete a polymerization reaction and a comparative cement dispersant (I-1) which comprised an aqueous solution of a polymer having a weight average molecular weight of 7,800 was obtained.

<Comparative Example A2 for producing comparative cement dispersant (I-2)>

A comparative cement dispersant (I-2) which comprised an aqueous solution of a polymer having a weight average molecular weight of 4,300 was obtained in the same manner of Example 2 of Japanese Patent Publication (Kokoku) No. Heisei 4-68323 (JP-B-04068323).

The results are shown in Table 1. It is understood from Table 1 that the cement dispersant of the present invention has a higher polymerization degree of the monomer (I) than that of the comparative cement dispersant and the weight average molecular weight thereof can be freely increased to a level suitable for a cement dispersant.

TABLE 1

| | | Polymerization conditions | | | Polymerization results | | |
|---|---|---|---|---|---|---|---|
| | | | | | Weight | Polymerization degree (mol %) | |
| | Cement | Radical | | | average | | |
| | dispersant used | polymerization initiator[b] | Temperature (° C.) | Concentration (wt %) | molecular weight | IPN-35[a] | Maleic acid |
| Example A1 | Cement dispersant (I-1) | APS | 60 | 60 | 34,000 | 80 | 99 |
| Example A2 | Cement dispersant (I-2) | APS | 60 | 20 | 17,600 | 60.9 | 99 |
| Example A3 | Cement dispersant (I-3) | APS | 60 | 96 | 25,400 | 67 | 99 |
| Comparative Example A1 | Comparative cement dispersant (I-1) | APS | 95 | 65 | 7,800 | 76 | 99 |
| Comparative Example A2 | Comparative cement dispersant (I-2) | APS | 95 | 58 | 4,300 | 78 | 99 |

Note:
[a] prepared by adding 35 moles of ethylene oxide to 3-methyl-3-butene-1-ol
[b] ammonium persulfate <Examples A4 to A6 and Comparative Examples A3 to A4>

Mortar Test Example

The mortar flow values were compared using polymer aqueous solution of the cement dispersants (I-1) to (I-3) of the present invention and polymer aqueous solutions of the comparative cement dispersant (I-1) and (I-2).

As for materials used in the test and the blending of a mortar, 400 g of ordinary portland cement of Chichibu Onoda, 800 g of standard sand of Toyoura and 260 g of ion exchange water containing polymers were used.

The mortar was prepared at room temperature by kneading with a mortar mixer and a hollow cylinder having a diameter of 55 mm and a height of 55 mm was filled with the mortar. Thereafter, the cylinder was vertically lifted up, the diameter of the mortar spread over the table was measured in two directions, and the average of the measured diameters was taken as a mortar flow value. The results are shown in Table 2.

TABLE 2

Results of mortar test

| | | | Flow value (mm) | | |
|---|---|---|---|---|---|
| | Cement dispersant used | Amount of cement dispersant (wt %)[a] | Immdiately after kneading | After 30 min. | After 60 min. |
| Example A4 | Cement dispersant (I-1) | 0.11 | 104 | 104 | 104 |
| Example A5 | Cement dispersant (I-2) | 0.132 | 98 | 90 | 88 |
| Example A6 | Cement dispersant (I-3) | 0.134 | 99 | 91 | 82 |
| Comparative Example A3 | Comparative cement dispersant (I-1) | 0.155 | 103 | 94 | 91 |
| Comparative Example A4 | Comparative cement dispersant (I-2) | 0.144 | 105 | 100 | 95 |

Note: [a] % by weight of a solid content based on cement

It is understood from Table 2 that the cement dispersants of the present invention provide the same mortar flow value in a smaller amount than the comparative cement dispersant since weight average molecular weights of the polymers of the present invention are higher than those of comparative cement dispersants.

The cement dispersant (I-1) has superior retention property of mortar flow value to that of the cement dispersant (I-2) using an aqueous solution having 20% of monomer concentration or (I-3) using an aqueous solution having 96% of monomer concentration since the cement dispersant (I-1)

is obatined using an aqueous solution having 60% of monomer concentration.
<Example B1 for the production of cement dispersant (II-1)>
A glass reactor equipped with a thermometer, stirrer, dropping funnel and reflux condenser was charged with 92.6 g of ion exchange water, 200 g of an unsaturated alcohol prepared by adding 35 moles of ethylene oxide to 3-methyl-3-butene-1-ol, and 16.1 g of maleic acid, and the temperature inside the reactor was elevated to 60° C. A solution of 2.6 g of sodium persulfate dissolved in 51.5 g of ion exchange water was added dropwise to the reactor in 180 minutes. The temperature of the reactor was maintained at 60° C. for 60 minutes and then a polymerization reaction was completed to.obtain a cement dispersant (II-1) comprising an aqueous solution of a polymer having a weight average molecular weight of 32,300 (measured by GPC in terms of polyethylene glycol).
<Example B1a and Comparative Example B1a>

Concrete Test

Ordinary portland cement (a mixture of three different cements having a specific gravity of 3.16 in equal amounts) as cement, a mixture of land sand around the Ooigawa River and mountain sand in Kisarazu (specific gravity of 2.62 and FM of 2.71) as a fine aggregate and crushed stone of hard sandstone in Oume (specific gravity of 2.64 and MS of 20 mm) as a coarse aggregate were used.

Concrete test was conducted using the cement dispersant (II-1) above-mentioned. The cement dispersant (II-1) of the present invention was used as the cement dispersant and a oxyalkylene-based antifoaming agent (a product of adding 5 moles of ethylene oxide and 35 moles of propylene oxide to hexanol) was used as the antifoaming agent(B) in Example B1a. As shown in Table 3, no antifoaming agent was used in Comparative Example B1a.

As for conditions for blending a plain concrete a containing no cement dispersant, the unit amount of cement was 320 kg/m$^3$, the unit amount of water was 203 kg/m$^3$ (water/cement ratio of 63.4 %) and the sand-aggregate ratio was 49%. As for conditions for blending a concrete containing a cement dispersant, the unit amount of cement was 320 kg/m$^3$, the unit amount of water was 166 kg/m$^3$ (water/cement ratio of 51.9%) and the sand-aggregate ratio was 47%.

Under the above conditions, 30 liters of a concrete was produced and a slump value and the amount of air were measured. A forced kneading mixer was used to knead the concrete and measurement methods for slump and the amount of air were based on Japanese Industrial Standards (JIS A 1101, 1128). The results are shown in Table 3.

TABLE 3

Results of concrete test

| | Aement admixture used | | | | Slump value (cm) (Amount of air (%)) | | |
|---|---|---|---|---|---|---|---|
| | Cement dispersant used | Amount of cement dispersant (wt %)$^{a)}$ | Antifoaming agent used | Amount of antifoaming agent (wt %)$^{b)}$ | Immdiately after kneading | After 30 min. | After 60 min. |
| Example B1a | Cement dispersant (II-1) | 0.2 | Oxyalkylene-based | 0.00036 | 20.0 (4.0) | 19.9 (3.3) | 17.5 (3.0) |
| Comparative Example B1a | Cement dispersant (II-1) | 0.16 | none | none | 18.8 (7.4) | 16.5 (6.5) | 12.0 (5.0) |

Note: $^{a), b)}$% by weight of a solid content based on cement

It is understood from Table 3 that whent only the cement dispersant (II-1) was used, the amount of air .was large at 7.4% whereas when the cement dispersant (II-1) and an antifoaming agent were used, the amount of air was able to be adjusted to an appropriate level, there were small changes in the amount of entrained air with the passage of time and a reduction in slump value with the passage of time was able to be suppressed.

<Examples B2 to B4 and Comparative Example B2>

Mortar test was conducted using the cement dispersant (II-1) above-mentioned. As shown in Table 4, a oxyalkylene-based antifoaming agent (a product of adding 5 moles of ethylene oxide and 35 moles of propylene oxide to hexanol), a silicone oil and stearic acid were used as the antifoaming agent (B), in Examples B2 to B4, respectively, and no antifoaming agent was used in Comparative Example B2.
[mortar test]

Blending proportions of materials and mortar used in the test were 400 g of ordinary portland cement (Chichibu-Onoda Cement Corporation), 800 g of standard sand (Toyoura), and 260 g of water containing a cement admixture.

Mortar was prepared with mechanical kneading by a mortar mixer, and mortar was packed in a hollow cylinder having a diameter of 55 mm and height of 55 mm. Next, after lifing up the cylinder vertically, a diameter of mortar spread on a table was measured in two directions, and the average was used as a flow value. The results are shown in Table 4.

TABLE 4

Results of concrete test

| | Cement admixture used | | | | | |
|---|---|---|---|---|---|---|
| | Cement dispersant used | Amount of cement dispersant (wt %)[a] | Antifoaming agent used | Amount of antifoaming agent (wt %)[b] | Flow value (mm) | Amount of air (vol %) |
| Comparative Example B2 | Cement dispersant (II-1) | 0.26 | None | None | 104 | 9 |
| Example B2 | Cement dispersant (II-1) | 0.26 | Oxyalkylene-based | 0.00013 | 102 | 5.8 |
| Example B3 | Cement dispersant (II-1) | 0.26 | Silicone oil | 0.1 | 113 | 6.6 |
| Example B4 | Cement dispersant (II-1) | 0.26 | Stealic acid | 0.01 | 94 | 5.7 |

Note: [a], [b] % by weight of a solid content based on cement

From Table 4, it is understood that when any antifoaming agent of oxyalkylene based-antifoaming agent, silicone oil and stearic acid is used the amount of air in mortar is able to be controlled. Among those antifoaming agent, the oxyalkylene based-antifoaming agent can reduce the amount of entrained air at the smallest amount of addition. In a case where no antifoaming agent is used the amount of air is large.

<Examples B5 and B6>

38% mixture aqueous solutions of the cement dispersant and the antifoaming agent were prepared at the same ratio as Examples B2 and B3, respectively. Ten grams of the mixture aqueous solutions were charged in 20 ml glass bottles, respectively, and the solutions in the bottles were observed by naked eyes. The results are shown in Table 5.

TABLE 5

Results of comptibility test

| | Aement admixture used | | Appearance | |
|---|---|---|---|---|
| | Cement dispersant used | Antifoaming agent used | Immdiately after kneading | After settled state for 12 hours |
| Example B5 | Cement dispersant (II-1) | Oxyalkylene-based | Transparent and homogeneous | Transparent and homogeneous |
| Example B6 | Cement dispersant (II-1) | Silicone oil | White turbid | Separated |

The combination of silicone oil and the cement dispersant (II-1) in Example B6 takes defoaming effect as confirmed in Example B4, but has disadvantages that white turbidity occurs immediately after kneading of the dispersant and the antifoaming agent and that after 12 hours the antifoaming agent separates.

On the other hand, according to the combination of the oxyalkylene based antifoaming agent and the cement dispersant (II-1) in Example B5 the mixture aqueous solution is transparent after kneading and separation does not occur after 12 hours of kneading.

It is understood from the above-mentioned results that the combination of the oxyalkylene based antifoaming agent and the cement dispersant is especially preferable since when that combination is used, the amount of antifoaming agent used was extremely small and the separation of the oxyalkylene based antifoaming agent and the cement dispersant does not occur.

What is claimed is:

1. A cement composition comprising cement, water and a cement additive, with the cement additive comprising:

a copolymer (A) as an effective component, wherein the copolymer (A) has a weight average molecular weight in a range of 10,000 to 100,000 and is obtained by polymerization of 50 to 99 wt % of an unsaturated polyalkylene glycol ether-based monomer (I) represented by the following general formula (1):

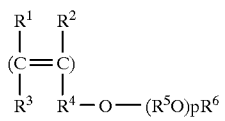

(1)

(wherein $R^1$, $R^2$ and $R^3$ each independently represent hydrogen or a methyl group, $R^1$, $R^2$ and $R^3$ cannot be a methyl group at the same time, $R^4$ represents —$CH_2$—, —$(CH_2)_2$— or —$C(CH_3)_2$—, a total number of carbon atoms in $R^1$, $R^2$, $R^3$ and $R^4$ is 3, $R^5O$ represents one oxyalkylene group having 2 to 4 carbon atoms or a mixture of two or more of the oxyalkylene group and may be added in a block or random manner when it is a mixture, $R^6$ represents hydrogen, and p is an average addition number of moles of the oxyalkylene groups and represents an integer of 1 to 300); 50 to 1 wt % of maleic acid-based monomer (II) represented by the following general formula (2):

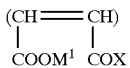

(2)

(wherein X represents —$OM^2$ or —Y—$(R^7O)gR^8$, $M^1$ and $M^2$ each independently represent hydrogen, a monovalent metal, divalent metal, ammonium or organic amine, Y represents —O— or —NH—, $R^7O$ represents one oxyalkylene group having 2 to 4 carbon atoms or a mixture of two or more of the oxyalkylene group and may be added in a block or random manner when it is a mixture, $R^8$ represents hydrogen, an alkyl group having 1 to 22 carbon atoms, phenyl group, alkylphenyl group, aminoalkyl group or hydroxylalkyl group (each alkyl group in the alkylphenyl, aminoalkyl and hydroxyalkyl groups having 1 to 22 carbon atoms), q is an average addition number of moles of the oxyalkylene groups and represents an integer of 0 to 300, and an acid anhydride group (—CO—O—CO—) may be formed in place of the groups —COOM$^1$ and —COX$^1$ between carbon atoms to which the groups —COOM$^1$ and —COX$^1$ should be bonded respectively);and 0 to 49 wt % of copolymerizable other monomer (III) (a total amount of (I), (II) and (III) being 100 wt %).

2. A method for dispersing cement, comprising: mixing water, cement, and the cement additive of claim 1.

3. The method of claim 2, wherein said mixing step comprises: dissolving said cement additive into water; and mixing said cement with said water in which said cement additive is dissolved.

4. The method of claim 2, wherein said mixing step comprises: mixing said cement additive and said cement; and mixing the obtained mixture and water.

5. The cement composition according to claim 1, and further comprising an antifoaming agent (B).

6. A cement composition comprising cement, water and a cement additive, with the cement additive comprising:

a copolymer (A-1) and an antifoaming agent (B) as effective components, wherein the copolymer (A-1) comprises as repeating units:

a polyalkylene glycol ether-based unit (I') represented by the following general formula (3):

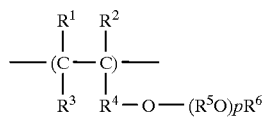

(3)

(wherein $R^1$ to $R^3$ each independently represent hydrogen or a methyl group $R^5O$ represents one oxnalkylene group having 2 to 4 carbon atoms or a mixture of two or more of the oxyalkylene group and may be added in a block or random manner when it is a mixture, $R^6$ represents hydrogen, $R^4$ represents —(CH$_2$)$_2$— or —C(CH$_3$)$_2$—, and p is an average addition number of moles of the oxyalkylene groups and represents an integer of 1 to 300); and a dicarboxylic acid-based unit (II') represented by the following general formula (4):

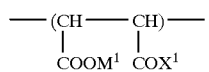

(4)

(wherein $X^1$ represents —OM$^2$ or —Y—(R$^7$O)qR$^8$, M$^1$ and M$^2$ each independently represent hydrogen, a monovalent metal, divalent metal, ammonium or organic amine, Y represents —O— or —NH—, R$^7$O represents one oxvalkyene group having 2 to 4 carbon atoms or a mixture of two or more of the oxyalkylene group and may be added in a block or random manner when it is a mixture, $R^8$ represents hydrogen, an alkyl group having 1 to 22 carbon atoms, phenyl group, alkylphenyl group, aminoalkyl group or hydroxylalkyl group (each alkyl group in the alkylphenyl, aminoalkyl and hydroxyalkyl groups having 1 to 22 carbon atoms), q is an average addition number of moles of the oxyalkylene groups and represents an integer of 0 to 300, and an acid anhydride group (—CO—O—CO—) may be formed in place of the groups —COOM$^1$ and —COX$^1$ between carbon atoms to which the groups —COOM$^1$ and —COX$^1$ should be bonded respectively).

7. A cement composition comprising cement, water and a cement additive, with the cement additive comprising:

a copolymer (A-2) and an antifoaming agent (B) as effective components, wherein the copolymer (A-2) comprises as repeating units:

a polyalkylene glycol ether-based unit (I") represented by the following general formula (5):

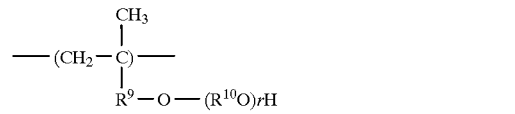

(5)

(wherein $R^{10}O$ represents one oxyalkylene group having 2 to 4 carbon atoms or a mixture of two or more of the oxyalkylene group and may be added in a block or random manner when it is a mixture, $R^9$ represents —(CH$_2$)$_2$— or —C(CH$_3$)$_2$—, and r is an average addition number of moles of the oxyalkylene groups and represents an integer of 1 to 300); and dicarboxylic acid-based units (II") represented by the following general formula (6):

(6)

(wherein $X^2$ represents —OM$^4$ or —Z—(R$^{11}$O)sR$^{12}$, $M^3$ and $M^4$ each independently represent hydrogen, a monovalent metal, divalent metal, ammonium or organic amine, Z represents —O— or —NH—, R$^{11}$O represents one oxyalkylene group having 2 to 4 carbon atoms or a mixture of two or more of the oxyalkylene group and may be added in a block or random manner when it is a mixture, $R^{12}$ represents hydrogen, an alkyl group having 1 to 22 carbon atoms, phenyl group, alkylphenyl group, aminoalkyl group or hydroxylalkyl group (each alkyl group in the alkylphenyl, aminoalkyl and hydroxyalkyl groups having 1 to 22 carbon atoms), s is an average addition number of moles of the oxyalkylene groups and represents an integer of 0 to 300, and an acid anhydride group (—CO—O—CO—) may be formed in place of the groups —COOM$^3$ and —COX$^2$ between carbon atoms to which the groups —COOM$^3$ and —COX$^2$ should be bonded respectively).

8. The cement composition according to claim 6 wherein the antifoaming agent (B) is an oxyalkylene-based antifoaming agent (B-1) represented by the following general formula (7):

(7)

(wherein $R^{13}$ and $R^{15}$ each independently represent hydrogen, alkyl group having 1 to 22 carbon atoms, alkenyl group having 1 to 22 carbon atoms, alkynyl group having 1 to 22 carbon atoms, phenyl group or alkylphenyl group (the alkyl group in the alkylphenyl group having 1 to 22 carbon atoms), R$^{14}$O represents one oxyalkylene group having 2 to 4 carbon atoms or a mixture of two or more of the oxyalkylene group and may be added in a block or random manner when it is a mixture, t is an average addition number of moles of the oxyalkylene groups and represents an integer of 0 to 300, $R^{13}$ and $R^{15}$ cannot be hydrogen at the same time when t is 0, T represents—, O—, —$CO_2$—, —$SO_4$—, —$PO_4$— or —NH—, n presents an integer of 1 or 2, and n is 1 when $R^{13}$ is hydrogen).

9. The method according to claim 2, and further comprising the step of mixing an antifoaming agent (B) in with the cement, water, and cement additive.

10. A method for dispersing cement, comprising: mixing cement, water and the cement additive of claim 6.

11. A method for dispersing cement, comprising: mixing cement water and the cement additive of claim 7.

12. The method according to claim 9 wherein the antifoaming agent (B) is an oxyalkylene-based antifoaming agent (B-1) represented by the following general formula (7):

$$R^{13}(-T-(R^{14}O)t-R^{15})n \qquad (7)$$

(wherein $R^{13}$ and $R^{15}$ each independently represent hydrogen, alkyl group having 1 to 22 carbon atoms, alkenyl group having 1 to 22 carbon atoms, alkynyl group having 1 to 22 carbon atoms, phenyl group or alkylphenyl group (the alkyl group in the alkylphenyl group having 1 to 22 carbon atoms), $R^{14}O$ represents one oxyalkylene group having 2 to 4 carbon atoms or a mixture of two or more of the oxyalkylene group and may be added in a block or random manner when it is a mixture, t is an average addition number of moles of the oxyalkylene groups and represents an integer of 0 to 300, $R^{13}$ and $R^{15}$ cannot be hydrogen at the same time when t is 0, T represents —O—, —$CO_2$—, —$SO_4$—, —$PO_4$— or —NH—, n presents an integer of 1 or 2, and n is 1 when $R^{13}$ is hydrogen).

* * * * *

UNITED STATES PATENT AND TRADEMARK OFFICE
CERTIFICATE OF CORRECTION

PATENT NO. : 5,912,284
DATED : June 15, 1999
INVENTOR(S) : Tsuyoshi Hirata et al.

It is certified that error appears in the above-identified patent and that said Letters Patent is hereby corrected as shown below:

Col. 12, line 9
  replace "reactor.equipped"
  with --reactor equipped--.

Col. 13, lines 64-65
  replace "by.knead"
  with --by knead--.

Col. 16, line 30
  replace "air .was"
  with --air was--.

Col. 18, line 63
  replace "$-Y-(R^7O)_g R^8$"
  with -- $-Y-(R^7O)_q R^8$ --.

Col. 19, line 42
  replace "a methyl group, $R^5O$ represents one oxnalkylene"
  with -- a methyl group, $R^5O$ represents one oxyalkylene--.

UNITED STATES PATENT AND TRADEMARK OFFICE
CERTIFICATE OF CORRECTION

PATENT NO. : 5,912,284
DATED : June 15, 1999
INVENTOR(S) : Tsuyoshi Hirata et al.

It is certified that error appears in the above-identified patent and that said Letters Patent is hereby corrected as shown below:

Col. 19, lines 61-62
  replace "oxvalkyene"
  with --oxyalkylene--.

Col. 21, line 14
  replace "cement water and"
  with --cement, water and--.

Signed and Sealed this

Sixth Day of June, 2000

Attest:

Attesting Officer

Q. TODD DICKINSON
Director of Patents and Trademarks